May 30, 1950 W. W. CROUCH 2,509,483
PRODUCTION OF THIOLESTERS
Filed Aug. 20, 1946
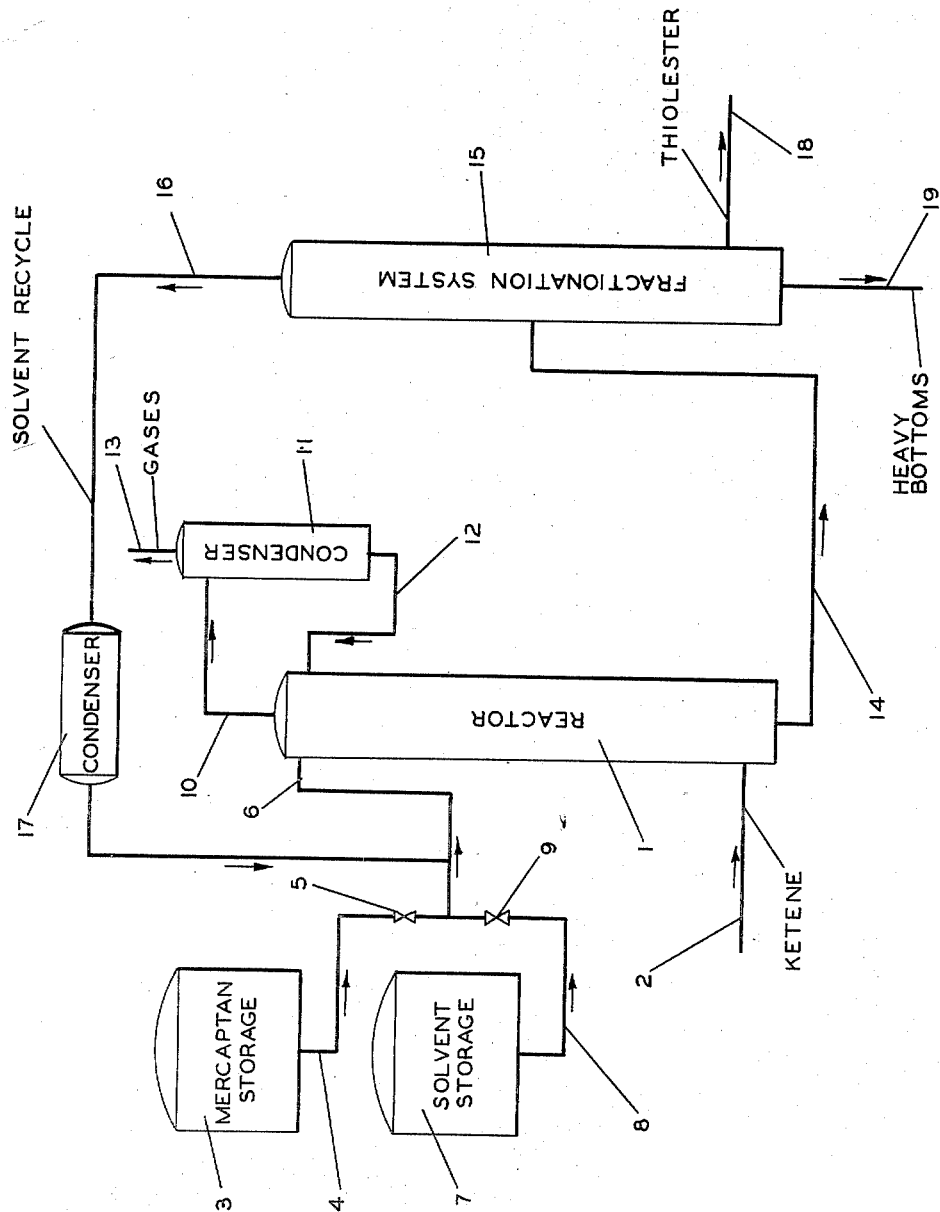
INVENTOR.
W. W. CROUCH
BY Hudson and Young
ATTORNEYS Patented May 30, 1950

2,509,483

UNITED STATES PATENT OFFICE 2,509,483

PRODUCTION OF THIOLESTERS

Willie W. Crouch, Bartlesville, Okla., assignor to Phillips Petroleum Company, a corporation of Delaware Application August 20, 1946, Serial No. 691,863

5 Claims. (Cl. 260—455)

This invention relates to the production of thiolesters from mercaptans. In a particular aspect it relates to the preparation of thiolesters by the interaction of mercaptans with compounds of the ketene group.

Thiolesters are an important class of compounds, being useful as intermediates in the preparation of other valuable substances, as well as for themselves as pharmaceuticals, such as soporifics and therapeutics, as plasticizing and modifying agents for synthetic and natural rubbers, resins and other polymeric materials, and insecticides and repellents, as material in optical studies, and the preparation of textile coatings, hoses, floor coverings and similar products.

Esterification to produce thiolesters has been described in several ways, such as by interaction between organic acids and mercaptans; between thio-acids and alcohols, olefins, or ethylene oxide; between acyl halides and mercaptans, such as described in my copending application, Serial No. 646,966, filed February 11, 1946, now abandoned; and between nitriles and mercaptans or between acid anhydrides and mercaptans, as described in the copending applications of C. M. Himel, respectively, Serial Nos. 640,385, filed January 10, 1946, now U. S. Patent 2,458,075, and 647,191, filed February 12, 1946, now U. S. Patent 2,445,142. Practically all of the processes necessitate the formation of by-products which are usually undesirable to some extent and generally need to be removed from the reaction zone to promote more complete reaction. It is generally recognized in esterification reactions, such as the interaction of alcohols with carboxylic acids, anhydrides, and the like, that a state of equilibrium is reached as the reaction proceeds. An analogous situation exists when attempts are made to prepare thiolesters by ordinary esterification methods. When high yields of the products are sought, it is obvious that some provision must be made in order that maximum utilization of the reactants is realized. Obviously, it would be highly advantageous to possess a process for the production of thiolesters wherein only the desired thiolester is produced as a reaction product of the process.

It is therefore an object of this invention to prepare thiolesters without attendant difficulties usually encountered.

Another object of this invention is to prepare thiolesters of the general formula RCOSR' in which R represents an alkyl group and R' represents an alkyl, aryl, or aralkyl group.

Still another object of the invention is to prepare thiolesters by the interaction of mercaptans with compounds from the group comprising ketene and its alkyl homologues.

A further object is the preparation of thiolacetates from mercaptans and ketene.

Other objects will be apparent to one skilled in the art from the specification and the annexed drawing which is a diagrammatic view of one method of practicing the present invention.

I have now found a process for the preparation of thiolesters from mercaptans whereby the disadvantages of the former processes are almost completely eliminated According to this new process, mercaptans may be converted readily to thiolesters by the interaction of said mercaptans with ketenes. Exceptionally high yields of thiolesters are produced according to the process described herein and, at the same time, no by-products are formed. While no particular mechanism is claimed for the reaction, the following equation may be written to illustrate the formation of the thiolacetates of this invention:

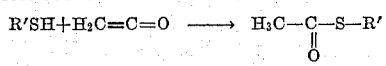

where R' represents an alkyl, aryl, or aralkyl group. Aldoketenes ($RCH=C=O$) and ketoketenes ($R_2C=C=O$) may be used in the place of ketene itself and a variety of thiolesters produced thereby. When materials such as acetic acid are employed for the production of thiolesters, the reaction with mercaptans is often too slow to be commercially valuable.

In a general embodiment the present process comprises the contacting of a ketene compound with the desired mercaptan, either in the presence or absence of a solvent, under conditions such that substantially complete reaction of the mercaptan is realized and only minor quantities of the ketene remain unabsorbed. The invention may be operated either as a batchwise or a continuous process although the latter is generally preferred. If it is desired to operate in a batchwise manner, however, the mercaptan is charged to a reactor of any conventional design which will allow for efficient contact with the ketene as it is introduced. Ketene from any convenient source is added at a controlled rate such that maximum absorption and subsequent reaction with mercaptan will occur. An alternative method which may sometimes be advantageous when operating this invention as a batchwise process is to use a series of reactors, each charged with mercaptan. Thus any ketene which is not absorbed in the first reactor may be carried over to subsequent chambers and thereby contacted with additional mercaptan. When it is preferred, the reaction may be carried out as a continuous operation; in this case, a countercurrent absorption column may be desirable. Employing this method, the mercaptan is preferably introduced at a point near the top of the reactor and contacted with an ascending stream of the ketene which is charged to the reactor through an inlet near the bottom. The mercaptan is added at such a rate that the residence time in the absorption column is relatively high. On the other hand, the addition of the ketene is regulated so that the mercaptan is practically completely converted to the ester when it reaches the bottom of the column and so that no appreciable amount of the ketene is lost at the top. Fractionation of the effluent from the bottom of the reactor yields the thiolester.

Although the alkyl homologues of ketene, the aldoketenes and the ketoketenes, may be used in this process, ketene ($CH_2=C=O$) itself is the most important compound of the group and will most generally be employed in the practice of this invention. For that reason the discussion, while not excluding the alkyl homologues, will be limited to the use of ketene as one of the major reactants. When using ketene, the product will be a thiolacetate ester, having a modifying radical corresponding to the group attached to the sulfhydryl group of the reacting mercaptan.

A better understanding of a method for the preparation of the thiolesters of the present invention may be had by reference to the accompanying drawing. Ketene from any convenient source, such as the pyrogenic decomposition of acetone, acetic anhydride, and the like, is introduced at an inlet near the bottom of reactor 1 via line 2 while mercaptan is fed from storage tank 3 through line 4, valve 5 and line 6 into reactor 1 through an inlet near the top. When the process is operated in the presence of a solvent, said solvent from storage tank 7 is passed through line 8 and valve 9 and thence into line 6 where it is admixed with mercaptan in controlled proportions before entering the reactor. As the reaction progresses only small quantities of fresh solvent need be added from time to time to replace minor amounts which are lost in mechanical operations. Provision is made for the solvent recycle stream to enter the mercaptan stream ahead of reactor 1. Thus the ratio of mercaptan to solvent may be controlled as desired. The reactor is equipped with bubble plates or trays or is otherwise designed to provide a means of retaining the mercaptan in contact with the ketene for a sufficient length of time to insure maximum reactivity of the materials. Waste gases from the ketene stream, such as, for example, methane, carbon monoxide, ethylene and the like, admixed with small quantities of mercaptan and solvent vapors may pass overhead through line 10 to condenser 11 where the mercaptan and solvent vapors are condensed and returned to the reactor via line 12 while the gases are vented through line 13. The thiolester stream is transferred from reactor 1 through line 14 and is introduced into fractionation system 15 where the solvent is taken overhead through line 16, is passed through condenser 17 and thence into the mercaptan feed stream 6. In the event that a small amount of reacted mercaptan should be present in the effluent from the reactor, it is recycled with the solvent to line 6. The thiolester is removed via line 18, and any heavy bottoms remaining in the fractionator are withdrawn through line 19. Various other valves, pumps, and other usual equipment for the operation of the process will be obvious to one skilled in the art and have been omitted for clarity of description.

The mercaptans which may be employed in this process include aliphatic mercaptans of primary, secondary and tertiary configuration and may range from low molecular weight to high molecular weight compounds. Tertiary mercaptans are now available through the catalytic addition of hydrogen sulfide to selected fractions of iso-olefins, especially those made by the polymerization of low-boiling olefins and normally liquid products of thermal and catalytic cracking of petroleum distillates, such as described in Schulze, U. S. Patents 2,392,554 and 2,392,555, issued January 8, 1946. Aromatic mercaptans with the sulfhydryl group linked directly to the aromatic nucleus may also be used as well as aralkyl compounds which contain the aromatic nucleus separated from the sulfhydryl group by one or more intervening carbon atoms. Pure mercaptans may be used or commercially available mixtures of mercaptans may be used, especially when employing heavier mercaptans.

As has been mentioned before, the other reactant most generally used is ketene. Freshly prepared ketene, such as from the pyrogenic decomposition of acetone, acetic anhydride, and the like in a heated tube between about 300° and 800° C. is usually preferred. Certain substituted ketenes may also be employed if desired. Alkyl homologues, such as the aldoketenes and ketoketenes, may be prepared by treating alpha bromo acid bromides with zinc dust.

The process of this invention may be operated either in the presence or absence of a solvent. In some cases in which low molecular weight mercaptans are employed it may be advisable to use a solvent since by this means the tendency of the mercaptan to vaporize is reduced and better contact with ketene is possible. However, any method which insures effective contact between the mercaptan and ketene and which provides a means whereby mechanical losses are reduced to a minimum is satisfactory. The ratio of absorption of ketene by mercaptans is variable depending upon the particular mercaptan employed. For example, some of the materials of high molecular weight react much more slowly than those with a smaller number of carbon atoms. In these cases also, a solvent is advantageous since it insures more effective contact between the reactants. With mercaptans of higher molecular weight, a solvent is frequently required to make the mercaptan satisfactorily fluid to be introduced into the process. Solvents which are applicable in this process must dissolve the mercaptan and absorb ketene and must also be inert to the reactants. The materials which may be used include hydrocarbons, particularly aromatic compounds such as benzene, ketones, such as acetone, and various ethers. The solvent chosen will depend upon the mercaptan selected for the preparation of the ester, upon the solubility or miscibility of the reactants in the solvent and its nonreactiveness with the reactants.

Temperatures which are employed in the preparation of the thiolesters of this invention may vary from about 50° to about 250° F. or higher, preferably between about 100° and 200° F. Obviously, reaction temperatures may vary over a fairly wide range since the mercaptans which may be used in the process show wide variations in reactivity. The temperature selected is governed largely by the stability and reactivity of the mercaptan being esterified. In general, the higher the molecular weight of the mercaptan, the more unstable the mercaptan and consequently, the lower the temperature which may satisfactorily be used. However, as the reactivity of the mercaptans normally decreases as the molecular weight increases, it is usually preferable to use higher reaction temperatures with the maximum below the temperature at which decomposition begins. The temperature employed is also dependent upon the properties, such as the vaporization temperature under the operating conditions, of the solvent and the mercaptan solvent mixture.

Operating pressures may vary from atmospheric to about 100 pounds per square inch gauge, preferably between about 10 and 50 pounds per square inch gauge. Ordinarily, only a slight superatmospheric pressure sufficient to maintain the flow of the ketene gas and other material through the system is necessary. In some cases it may be necessary to maintain slightly higher pressures in the reaction zone to prevent the volatilization of the mercaptan or mercaptan-solvent solution.

The reactants are allowed enough contact time in the reaction zone to permit substantially complete reaction. The necessary reaction time for satisfactory results is dependent upon several factors, such as the reactivity of the mercaptan and the ketene employed, the efficiency of the solvent in effecting contact between the reactants and the temperature and pressure conditions of operation. In a batchwise operation, ketene is supplied under proper conditions and conversion is usually substantially complete in from one to six hours. In the generally preferred continuous process employing countercurrent flow of reactants, the mercaptan or mercaptan-solvent stream is charged to the reactor at a controlled rate such that the residence time of mercaptan in the reactor is between about one to six hours and the flow of ketene, entering the reaction chamber from the bottom, is regulated so that substantially complete utilization of the ketene is realized before reaching the top of the chamber. Under controlled conditions of temperature, pressure, rates of charge and contact time the condensation of the mercaptan and the ketene to form thiolesters is the predominant reaction and only substantially small quantities of ketene and of mercaptan will be removed from the system unreacted.

The following examples illustrate the advantages and effectiveness of the present invention in the preparation of thiolesters. The present method for preparing thiolesters provides a convenient, economical process and gives unusually high yields of substantially pure products.

Example I

A charge of 2.46 mols of tertiary butyl mercaptan was placed in a conventional type of absorption tube. A ketene stream, which was generated by passing 4 cubic centimeters of acetone per minute through a tube filled with porcelain chips and maintained at 700° C., was passed through the mercaptan for a period 4.0 hours. The estimated purity of the ketene stream was approximately 15%. During the first half hour of the reaction period the temperature of the contents of the absorption tube increased from about 70° F. to about 120° F. The reaction temperature leveled off at this point and then decreased slightly toward the end of the run. The reaction pressure was maintained at substantially one atmosphere.

The rate of ketene addition was approximately 0.29 mol per mol of mercaptan per hour. At the conclusion of the reaction period the crude product was recovered and fractionated. A low boiling fraction which was removed first consisted principally of acetone carried into the absorber with the ketene stream. This acetone fraction contained only 1% unreacted mercaptan. After removal of the light fraction, a second fraction, boiling in the range of 129° to 135° C. and containing the tert-butyl thiolacetate product, was separated. This fraction comprised 89% of the acetone-free product. The thiolester content of the latter fraction was 95%.

Example II

Four absorbers were connected in series and each was charged with a 50 wt. per cent solution of tertiary dodecyl mercaptan in acetone. The total mercaptan charged amounted to 261 grams (1.29 mols). A ketene stream was prepared in a manner similar to that employed in Example I, introduced into the first absorber, and allowed to pass through each of the four absorbers in series. Tests were made on the ketene stream passing into the first absorber and the gas stream leaving the fourth absorber during the first 20 minutes of the run. These showed that 97% of the ketene in the feed stream was being utilized in the formation of tert-dodecyl thiolacetate. The reaction temperature increased from about 70° F. initially to approximately 130° F. during the first half hour of the reaction period. The ketene stream was passed into the mercaptan solution for a period of 2.48 hours.

The reaction mixture from the four absorbers was combined and the acetone separated by fractionation. The solvent-free product amounted to 281.9 grams and contained 77.5% thiolester, the remainder being unreacted mercaptan. In a similar run made under identical conditions the solvent-free product in the second reactor of the series was analyzed separately and was found to contain 98.2% thiolester.

The foregoing examples are illustrative only and are not intended to limit the invention. Various changes and modifications may be made in the procedure described and the process illustrated without departing from the spirit of the invention as claimed hereinafter.

I claim:

1. An improved process for the production of thiolesters which comprises contacting mercaptans with a gaseous ketene for a reaction period between about 1 to 6 hours in the presence of a mutually miscible, inert solvent at a temperature between about 50° and 250° F. and at a pressure between about atmospheric and 100 pounds per square inch gauge.

2. An improved process for the preparation of tert-butyl thiolacetate which comprises contacting tert-butyl mercaptan with gaseous ketene at a temperature of about 70 to 120° F. for a reaction period of about 4 hours.

3. An improved process for the preparation of tert-dodecyl thiolacetate which comprises passing gaseous ketene through a series of contact zones containing a solution of tert-dodecyl mercaptan in acetone at a temperature of about 70 to 130° F. for a reaction period of about 3 hours.

4. A process according to claim 1 in which the solvent is acetone.

5. The improved process for the production of thiolesters which comprises adding gaseous ketene to liquid mercaptan for a reaction period of between 1 to 6 hours at a temperature between about 50° and 250° F. and a pressure between about atmospheric and 100 pounds per square inch gauge.

WILLIE W. CROUCH.

REFERENCES CITED

The following references are of record in the file of this patent:

UNITED STATES PATENTS

| Number | Name | Date |
| --- | --- | --- |
| 2,133,735 | Waterman et al. | Oct. 18, 1938 |
| 2,212,895 | Allen | Aug. 27, 1940 |
| 2,259,869 | Allen | Oct. 21, 1941 |
| 2,351,366 | Pohl et al. | June 13, 1944 |
| 2,383,965 | Gwynn et al. | Sept. 4, 1945 |

OTHER REFERENCES

Staudinger: "Die Ketene" (1912), page 34.

Schmidlin et al.: "Ber. Deut. Chem. Ges.," vol. 43 (1910), pages 2822–2823.

Fraenkel-Conrat: "J. Biol. Chem.," vol. 152, pp. 385–9 (1944).